3,275,619
PROCESS FOR THE PREPARATION OF L-α-AMINO-ε-CAPROLACTAM AND INTERMEDIATE THEREFOR
Carl Max Brenner, Riehen, near Basel, and Hans Rudolf Rickenbacher, Basel, Switzerland, assignors to Geigy Chemical Corporation, Ardsley, N.Y., a corporation of Delaware
No Drawing. Filed Dec. 31, 1958, Ser. No. 784,054
Claims priority, application Switzerland, Mar. 15, 1957, 43,891/57
5 Claims. (Cl. 260—239.3)

This application is a continuation-in-part of application Serial No. 717,312, filed February 25, 1958, now abandoned.

The present invention concerns a new process for the preparation of L-α-amino-ε-caprolactam. This substance can be very easily hydrolyzed to form L-lysine, which latter can be used as an additive to animal or human foodstuffs, in particular to supplement vegetable proteins having a poor content of lysine.

The invention also relates to L-α-amino-ε-caprolactam L-2-pyrrolidone-5-carboxylate formed during the carrying out of the said process.

DL-α-amino-ε-caprolactam, M.P. 68–71° C., first obtained from DL-lysine methyl ester by D. W. Adamson, J. Chem. Soc., p. 39 (1943) has lately become easily obtainable by the hitherto unknown reaction of DL-α-chloro-ε-caprolactam with an alkali azide and hydrogenation of the resultant DL-α-azido-ε-caprolactam, so that a simple resolution thereof into its optical isomers would be of great importance for the eventual obtaining of L-lysine.

It has now been found that L-2-pyrrolidone-5-carboxylic acid combines with L-α-amino-ε-caprolactam to form the salt L-α-amino-ε-caprolactam L-2-pyrrolidone-5-carboxylate, which crystallizes well and which is difficultly soluble in low molecular-weight alcohols, other water-miscible solvents and mixtures of water-miscible organic solvents with up to 10% of water, whilst the corresponding salt with D-α-amino-ε-caprolactam, D-α-amino-ε-caprolactam L-2-pyrrolidone-5-carboxylate, is easily soluble under the same conditions. The difficultly soluble L-α-amino-ε-caprolactam L-2-pyrrolidone-5-carboxylate can be produced in a simple manner by, for example, adding to a methanol or 95% ethanol solution of DL-α-amino-ε-caprolactam a methanol or ethanol solution of at least a half molar equivalent, but more advantageously one molar equivalent, of L-2-pyrrolidone-5-carboxylic acid, whereupon the L-α-amino-ε-caprolactam L-2-pyrrolidone-5-carboxylate immediately begins to crystallize out. After being left to stand for several hours, the L-α-amino-ε-caprolactam L-2-pyrrolidone-5-carboxylate can be filtered off under suction, washed with the solvent and split up into its components by reacting with an acid which is stronger than 2-pyrrolidone-5-carboxylic acid.

The salt can be split, for example, by suspending it in a solution of hydrogen chloride in dioxan and warming. On cooling, the precipitate of L-α-amino-ε-caprolactam hydrochloride is filtered off. The mother liquor consists of a solution of L-2-pyrrolidone-5-carboxylic acid and hydrogen chloride in dioxan.

The L-2-pyrrolidone-5-carboxylic acid left in the alcoholic mother liquor after the formation of the L-α-amino-ε-caprolactam L-2-pyrrolidone-5-carboxylate is precipitated in the form of its barium salt by adding barium alcoholate to the mother liquor. The filtrate which contains chiefly D-α-amino-ε-caprolactam is evaporated and the residue is then racemized by heating it under vacuum with a little alkali alcoholate, in particular sodium ethylate, for a short time at a little under the boiling point of the α-amino-ε-caprolactam (B.P.$_{12\,mm}$ 165–168° C.). The racemate is isolated by distillation and, if desired, it can be used again for the preparation of further L-α-amino-ε-caprolactam L-2-pyrrolidone-5-carboxylate.

The barium salt of L-2-pyrrolidone-5-carboxylic acid precipitated from the alcoholic filtrate can be added to the dioxan solution of the L-2-pyrrolidone-5-carboxylic acid liberated from the L-α-amino-ε-caprolactam L-2-pyrrolidone-5-carboxylate substantially in an amount equivalent to the hydrogen chloride content of the dioxan solution. The barium chloride then precipitates and there is thus only a single solution of L-2-pyrrolidone-5-carboxylic acid to work up to recover this acid.

If ethanol is used as solvent, L-α-amino-ε-caprolactam L-2-pyrrolidone-5-carboxylate is obtained directly in a yield of about 95%. Alcohols having more than two carbon atoms, such as, for example, isopropanol or n-butanol, are less suitable because L-α-amino-ε-caprolactam L-2-pyrrolidone-5-carboxylate precipitates therefrom in the form of a gel which cannot be filtered. With methanol as solvent, L-α-amino-ε-caprolactam L-2-pyrrolidone-5-carboxylate is obtained in a yield of only about 75% in the first crystallization. However, the mother liquor from the first crystallization can be used as the solvent for a second resolution with the same amounts of starting material by, for example, dividing the mother liquor into two equal portions, dissolving the DL-α-amino-ε-caprolactam in one half and the L-2-pyrrolidone-5-carboxylic acid in the other half, and then combining the two solutions. L-α-amino-ε-caprolactam L-2-pyrrolidone-5-carboxylate crystallizes from this medium in a yield of 75%, based on the total content of L-α-amino-ε-caprolactam L-2-pyrrolidone-5-carboxylate, and 95% based on the L-α-amino-ε-caprolactam content of the DL-α-amino-ε-caprolactam newly added. The mother liquor obtained in this case can be divided into two equal parts, of which one part after dilution with an equal volume of methanol can serve as a medium for a resolution with the same amounts of starting material by dividing it again into two equal parts and dissolving one resolution component in each part. After combining both solutions, L-α-amino-ε-caprolactam L-2-pyrrolidone-5-carboxylate again crystallizes in a yield of about 95% based on the L-α-amino-ε-caprolactam content of the racemic DL-α-amino-ε-caprolactam newly added. The mother liquor is again divided and, after suitable dilution, one half of it is used as medium for a further resolution. In the same way, each further resolution is carried out in one half of the mother liquor derived from the previous resolution.

All halves of mother liquor not used for further resolution and taken out from the precedure are worked up by the methods described above for regaining L-2-pyrrolidone-5-carboxylic acid and racemizing the remaining α-amino-ε-caprolactam.

The process consists essentially in:
(a) combining a methanol solution of DL-α-amino-ε-caprolactam with substantially an equimolar amount of L-2-pyrrolidone-5-carboxylic acid dissolved in methanol, whereby difficultly soluble L-α-amino-ε-caprolactam L-2-pyrrolidone-5-carboxylate RI (resolution salt, batch 1) precipitates,
(b) separating RI by filtering, thus obtaining RI and mother liquor MRI,
(c) splitting RI into the L-2-pyrrolidone-5-carboxylic acid and SI which is the first batch of the hydrohalic salt of L-α-amino-ε-caprolactam by reacting it with a dioxan solution of a hydrogen halide, and
(d) filtering off SI which precipitated in step (c), thus obtaining mother liquor MSI,
(e) dividing mother liquor MRI into two equal parts MRI/2, dissolving substantially equimolar parts of DL-α-amino-ε-caprolactam and L-2-pyrrolidone-5-carboxylic acid respectively in each of MRI/2 and combining both solutions for precipitation of L-α-amino-ε-caprolactam L-2-pyrrolidone-5-carboxylate, second batch RII, (f) repeating step (b), thus obtaining RII and mother liquor MRII, dividing MRII into two equal parts MRII/2, (g) regaining the L-2-pyrrolidone-5-carboxylic acid from mother liquor MRII/2 by adding thereto barium methylate, thus precipitating the barium salt BI of L-2-pyrrolidone-5-carboxylic acid and gaining the mother liquor MBI containing chiefly D-α-amino-ε-caprolactam, (h) concentrating mother liquor MBI and racemizing the D-α-amino-ε-caprolactam by heating it in the presence of an alkali alcoholate and then distilling it for re-use in the process, (i) adding the barium salt BI to the dioxan solution MSI of step (d) in an amount equivalent to the hydrogen halide content of the dioxane solution MSI, filtering off from the precipitated barium halide thus gaining the L-2-pyrrolidone-5-carboxylic acid in dioxan solution for re-use in the process, (j) diluting mother liquor MRII/2 of step (f) with about the same volume of methanol, dividing the solution into two equal parts, dissolving substantially equimolar parts of DL-α-amino-ε-caprolactam and of L-2-pyrrolidone-5-carboxylic acid respectively in each part and combining both solutions for the precipitation of L-α-amino-ε-caprolactam L-2-pyrrolidone-5-carboxylate RIII. Steps (b), (c) and (d) are repeated yielding RIII, the mother liquor MRIII and the hydrohalic salt of the L-base SIII and mother liquor MSIII. From MRIII/2 in an analogous manner L-α-amino-ε-caprolactam L-2-pyrrolidone-5-carboxylate RIV and its mother liquor MRIV are obtained. RIV yields the hydrohalic salt SIV of the L-α-amino-ε-caprolactam and the mother liquor MSIV. Repetition of the above processes will yield RV, RVI etc., MRV, MRVI etc., SV, SVI etc. and MSV, MSVI etc.

The L-α-amino-ε-caprolactam L-2-pyrrolidone-5-carboxylates RI, RII and RIII etc. may be combined and worked up together in a single process. In step (c) and analogous steps hydrogen bromide and preferably hydrogen chloride may be used as the hydrohalic acid.

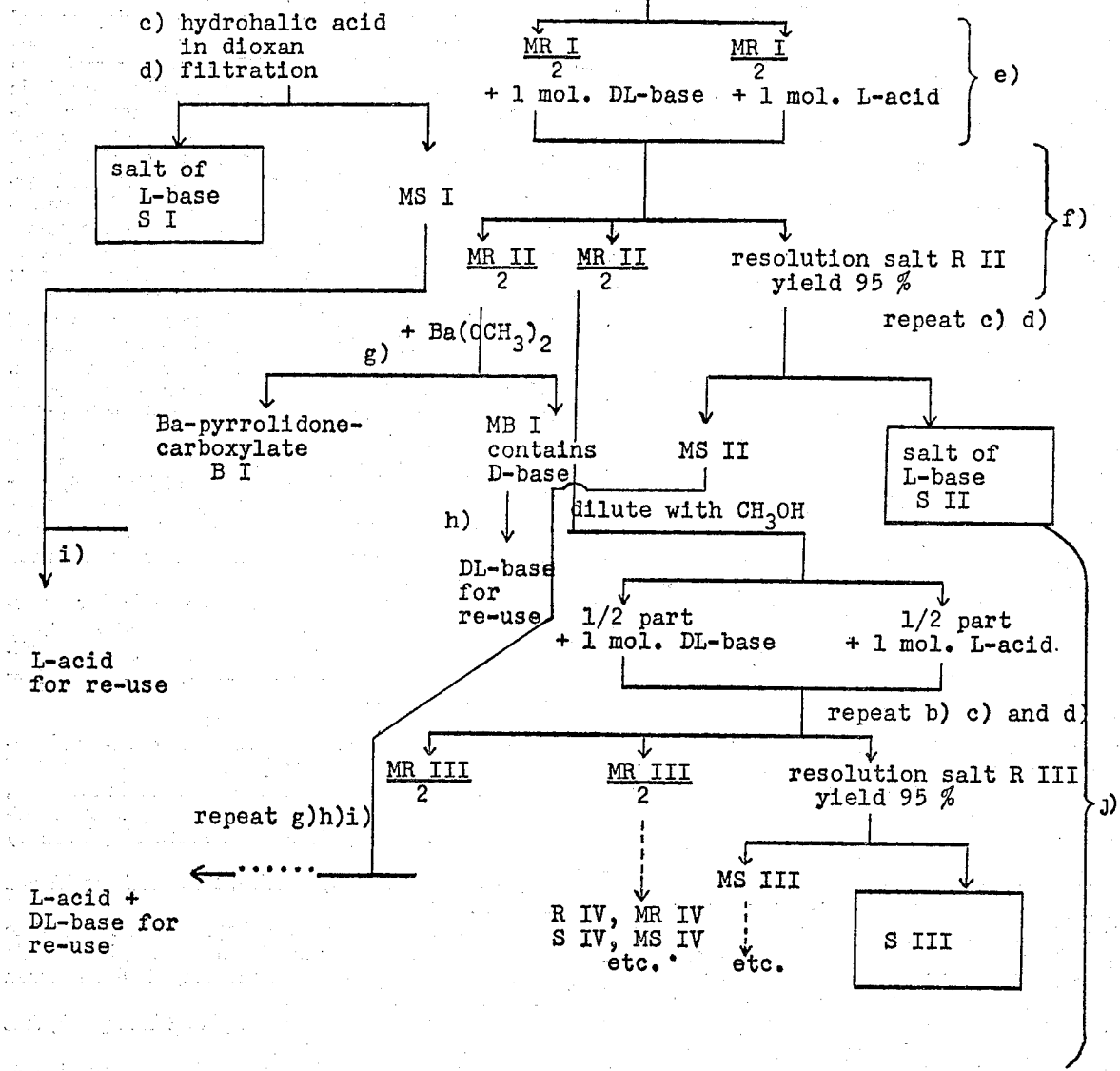

The whole process can be illustrated by the following fractionation scheme, in which "acid" means 2-pyrrolidone-5-carboxylic acid and "base" means α-amino-ε-caprolactam and the several steps in the procedure are designated by (a), (b), (c) etc. The symbols RI, RII etc., SI, SII etc., MRI, MRII etc., etc. used in the fractionation scheme are identical with those in the aforementioned written description.

Even when methanol is used as solvent in this resolution scheme, less than 10% of the L-base contained in the racemic starting material becomes subjected to racemization.

The use of methanol is more advantageous than the use of ethanol because the barium methylate is easily soluble in anhydrous methanol and is therefore more suitable for regaining the L-2-pyrrolidone-5-carboxylic acid than the barium ethylate which is only difficultly soluble in ethanol. The use of barium methylate together with ethanol leads to complications when recovering the alcohols.

Conversion of L-α-amino-ε-caprolactam L-2-pyrrolidone-5-carboxylate into its components, L-α-amino-ε-caprolactam and L-2-pyrrolidone-5-carboxylic acid by use of hydrogen chloride in dioxan as described in the fractionation scheme above is particularly advantageous from the point of view of the purity and the yield of the hydrochloride of L-α-amino-ε-caprolactam obtained and the ease of regaining the L-2-pyrrolidone-5-carboxylic acid. However, it will be apparent to those skilled in the art that numerous variations can be made in the above described processes. L-lysine or its salts can be obtained from the mineral acid salts of L-α-amino-ε-caprolactam by hydrolytic procedures already known to the art. For example, L-α-amino-ε-caprolactam hydrochloride can be hydrolyzed by boiling with dilute hydrochloric acid. On evaporation, a quantitative yield of pure L-lysine dihydrochloride is obtained.

The free base, L-α-amino-ε-caprolactam can be liberated from the hydrohalide by treating a solution of this salt with substantially an equivalent of alkali metal hydroxide solution. The L-α-amino-ε-caprolactam so obtained in aqueous solution has an optical rotation $[\alpha]_D^{22}$ of $-40.4° \pm 1°$ (water, 1.17).

The above process with the hydrohalide can be performed on any strong mineral acid salt of L-α-amino-ε-caprolactam. The aqueous solution of L-α-amino-ε-caprolactam and alkali metal salt that results from the alkali treatment is evaporated to dryness and the L-α-amino-ε-caprolactam sublimed from the residue at about 80–90° C. at reduced pressure. The free base, L-α-amino-ε-caprolactam, just like the hydrohalide salts of this base, can be hydrolyzed to a L-lysine salt by heating with a dilute mineral acid.

The following examples set forth methods of carrying out the present invention, but it is to be understood that modifications may be made in carrying out this invention without departing from the spirit and scope thereof and the invention is to be limited only by the appended claims.

EXAMPLE 1

*Preparation of L-α-amino-ε-caprolactam L-2-pyrrolidone-5-carboxylate in ethanol*

12.8 g. of DL-α-amino-ε-caprolactam are dissolved in 100 ml. of 95% alcohol and, in another vessel, 12.9 g. of L-2-pyrrolidone-5-carboxylic acid are dissolved in 100 ml. of 95% alcohol. After the two solutions are combined, the salt quickly begins to crystallize out. After standing for about 15 hours the compact crystal mass obtained is broken up and the crystals are filtered off by suction and washed twice with alcohol. Yield: 12.4 g. (96.5%). M.P. 203–204° C. (decomp.)

$$[\alpha]_D^{22} = -31.4° \pm 1°$$

(water, concentration=5.31).

EXAMPLE 2

*Preparation of L-α-amino-ε-caprolactam L-2-pyrrolidone-5-carboxylate in methanol*

15.4 g. of DL-α-amino-ε-caprolactam are dissolved in 60 ml. of methanol and, in another vessel, 15.5 g. of L-2-pyrrolidone-5-carboxylic acid are dissolved in 60 ml. of methanol. The solutions are mixed. After standing for about 15 hours, the compact crystal mass formed is broken up, the crystals are filtered off under suction and washed with two 10 ml. batches of methanol. The L-α-amino-ε-caprolactam L-2-pyrrolidone-5-carboxylate is then dried in vacuo. Yield: 11.6 g. (75%). M.P. 198–201° C. (decomp.) $[\alpha]_D^{22} = -31.8° \pm 1°$ (concentration=3.77).

The filtrate obtained above is divided into two equal parts: 15.4 g. of DL-α-amino-ε-caprolactam are dissolved in one part, and 15.5 g. of L-2-pyrrolidone-5-carboxylic acid are dissolved in the other part. The solutions are mixed. After 4 hours, the compact crystal mass formed is broken up, the crystals are filtered off under suction and washed with a 15 ml. batch of methanol and then with two 10 ml. batches of methanol. Yield: 14.7 g. (95%), calculated on the L-α-amino-ε-caprolactam in the DL-α-amino-ε-caprolactam newly added. M.P. 198–201° C. (decomp.) $[\alpha]_D^{22} = -30.7° \pm 1°$.

The filtrate obtained above is divided into two equal parts. From one part the L-2-pyrrolidone-5-carboxylic acid is regained according to the barium methylate method (Example 3). The second part is diluted with a little less than the same volume of methanol and then, like the first filtrate, is used as solvent in an analogous manner to the second batch in the above paragraph for the formation of a further batch. The same procedure can be used for the formation of all further batches.

EXAMPLE 3

*Regaining of D-α-amino-ε-caprolactam (as racemized DL-α-amino-ε-caprolactam) and regaining of the L-2-pyrrolidone-5-carboxylic acid (as barium salt)*

2.3 N-barium methylate solution is added with stirring to the half of the filtrate from the second batch of Example 2 which contains, apart from a lot of D-α-amino-ε-caprolactam, some DL-α-amino-ε-caprolactam as well as the corresponding amount of L-2-pyrrolidone-5-carboxylic acid (total about 18 g. of salt) until the filtrate is alkaline to phenolphthalein. The red colored barium salt of L-2-pyrrolidone-5-carboxylic acid is filtered off under suction and washed once with methanol and twice with dioxan. The filtrate is concentrated in vacuo. 30 mg. of sodium are dissolved in the material remaining. After this the mixture is heated in vacuo at 160° C. for 30 minutes to effect racemization of the α-amino-ε-caprolactam. During this time dry air from which the carbon dioxide has been removed was introduced into the racemizing mixture through a capillary. The completely racemized α-amino-ε-caprolactam is distilled off under about 12 mm. pressure by raising the bath temperature from 160° to 180–190° C. B.P.$_{12 \text{ mm.}}$: 165–168° C., yield: 6.15 g. (70%).

The barium methylate solution used in the above example can be produced by refluxing methanol with excess barium oxide for one hour and then filtering off the excess barium oxide and the barium hydroxide also formed in the reaction. The barium methylate content of the solution is determined by titration.

EXAMPLE 4

*Preparation of L-α-amino-ε-caprolactam hydrochloride from L-α-amino-ε-caprolactam L-2-pyrollidone-5-carboxylate*

11.6 g. of L-α-amino-ε-caprolactam L-2-pyrrolidone-5-carboxylate are suspended in 100 ml. of dioxan. The suspension is stirred, heated to 90° C., and then 24.5 ml. of 3.7 N-hydrogen chloride solution in dioxan are added. It is allowed to cool. After two hours, the hydrochloride is filtered off under suction and then washed with two batches of 15 ml. of dioxan. As this product still contains about 2% of L-2-pyrrolidone-5-carboxylic acid, the precipitate, while still damp, is stirred for 30 minutes with 60 ml. of 2.7 N-hydrogen chloride solution in isopropanol. All the L-2-pyrrolidone-5-carboxylic acid dissolves. The L-α-amino-ε-caprolactam hydrochloride which is insoluble in isopropanol is filtered off under suction and washed with two batches of 5 ml. of isopropanol. The yield of vacuum-dried L-α-amino-ε-caprolactam hydrochloride is 6.95 g. (93.5%) $[\alpha]_D^{22} = -24.5° \pm 1.2°$ (N-hydrochloric acid, concentration =3.2). The specific rotation of the free base, i.e. of 15.0 mg. hydrochloride in 1 ml. of 0.1 N-sodium hydroxide solution is $[\alpha]_D^{22} = -40.4° \pm 1°$ (concentration of base =1.17). The L-α-amino-ε-caprolactam hydrochloride melts at 280–290° (decomp.).

EXAMPLE 5

*Preparation of L-lysine dihydrochloride from L-α-amino-ε-caprolactam hydrochloride*

The L-α-amino-ε-caprolactam hydrochloride is hydrolyzed to L-lysine dihydrochloride by boiling under reflux for 2 hours with 20 times the amount of 6 N-hydrochloric acid. After evaporation of the solution and complete removal of the hydrochloric acid, water is added to the residue, then distilled off. The addition of water and the distillation of the water from the residue are repeated twice more. The L-lysine dihydrochloride remaining in quantitative yield is paper chromatographically and paper electrophoretically pure. $[\alpha]_D^{22} = +26.7° \pm 1°$ (in the literature +25.9°).

EXAMPLE 6

*Regaining of L-2-pyrrolidone-5-carboxylic acid*

The filtrate of Example 4—a solution of L-2-pyrrolidone-5-carboxylic acid and hydrogen chloride in dioxan— is mixed with an amount of the barium salt of L-2-pyrrolidone-5-carboxylic acid obtained according to Example 3 such that there are two molecules of hydrogen chloride to one molecule of barium salt, and the mixture is stirred. The barium chloride which precipitates is filtered off under suction. On evaporating the filtrate the L-2-pyrrolidone-5-carboxylic acid is regained.

EXAMPLE 7

*Preparation of L-α-amino-ε-caprolactam*

3.0 g. of L-α-amino-ε-caprolactam hydrochloride are dissolved in 5.5 ml. of water and the resulting solution is treated with 17.8 ml. of 1.0 N-sodium hydroxide, then is evaporated to dryness at 0° C. in vacuo. The residue (3.6 g.) heated under vacuum at 80–90° C. gives a white sublimate of pure L-α-amino-ε-caprolactam, M.P. 71–72° C. (2.4 g.; 97.6%) and leaves unsublimed sodium chloride (1.2 g.). The unsublimed residue of sodium chloride gives a neutral reaction indicating that substantially all the L-α-amino-ε-caprolactam is removed by the sublimation process. The specific rotation $[\alpha]_D^{25}$ of the pure L-α-amino-ε-caprolactam is 42.8° ±1.5° (water, 1.39), and the analysis is carbon 55.83%, hydrogen 9.39% and nitrogen 21.01% (theory C: 56.25; H: 9.44; N: 21.87). The material is highly hygroscopic.

EXAMPLE 8

*Preparation of L-lysine dihydrochloride from L-α-amino-ε-caprolactam*

The L-α-amino-ε-caprolactam is hydrolyzed to L-lysine dihydrochloride by boiling under reflux for 2 hours with 30 times the amount of 6 N-hydrochloric acid. After evaporation of the solution and complete removal of the hydrochloric acid, water is added to the residue, then distilled off. The addition of water and the distillation of the water from the residue is repeated twice more. The L-lysine dihydrochloride remaining in quantitative yield is paper chromatographically and paper electrophoretically pure.

EXAMPLE 9

*Preparation of L-α-amino-ε-caprolactam hydrobromide from L-α-amino-ε-caprolactam L-2-pyrrolidone-5-carboxylate*

11.6 g. of L-α-amino-ε-caprolactam L-2-pyrrolidone-5-carboxylate are suspended in 100 ml. of dioxan. The suspension is stirred, heated to 90° C., and then 36.5 ml. of 2.5 N-hydrogen bromide solution in dioxan are added. It is allowed to cool. After two hours, the hydrobromide is filtered off under suction and then washed with two batches of 15 ml. of dioxan. As this product still contains about 2% of L-2-pyrrolidone-5-carboxylic acid, the precipitate, while still damp, is stirred for 30 minutes with 65 ml. of 2.1 N-hydrogenbromide solution in isopropanol. All the L-2-pyrrolidone-5-carboxylic acid dissolves. The L-α-amino-ε-caprolactam hydrobromide which is insoluble in isopropanol is filtered off under suction and washed with two batches of 5 ml. of isopropanol. The yield of vacuum-dried L-α-amino-ε-caprolactam hydrobromide is 9.0 g. (95%). From methanol, the hydrobromide forms needles, which at about 150° C. are converted into plates; the material melts at 297–299° C. with slight decomposition. The solution in water is neutral to litmus.

EXAMPLE 10

*Preparation of L-α-amino-ε-caprolactam phosphate from L-α-amino-ε-caprolactam L-2-pyrrolidone-5-carboxylate*

514 mg. of L-α-amino-ε-caprolactam L-2-pyrrolidone-5-carboxylate are suspended in 4 ml. of dioxan. The suspension is stirred, heated to 90°, and then 198 mg. of crystalline $H_3PO_4$ in 1 ml. of dioxan are added. The resinous precipitate as first formed rapidly becomes crystalline. The reaction mixture is allowed to cool. After two hours the phosphate is filtered off under suction and then washed with two batches of 2 ml. of dioxan. This product, while still damp, is stirred for 30 minutes with 4 ml. of isopropanol containing 50 mg. of phosphoric acid. The L-α-amino-ε-caprolactam phosphate which is insoluble in isopropanol is filtered off under suction and washed with two batches of 2 ml. of isopropanol. The yield of air-dried phosphate is 435 mg. (94%); M.P. 252–254° C. The material is dissolved in 1.7 ml. of water to give a solution which is slightly acid to litmus. Upon addition of 10 ml. of 95% ethanol the L-α-amino-ε-caprolactam phosphate forms needles which are isolated by filtration and washing with 95% ethanol. The yield of recrystallized air-dried phosphate is 360 mg.; M.P. 252–253° C.

EXAMPLE 11

*Preparation of L-α-amino-ε-caprolactam sulfate from L-α-amino-ε-caprolactam L-2-pyrrolidone-5-carboxylate*

514 mg. of L-α-amino-ε-caprolactam L-2-pyrrolidone-5-carboxylate are suspended in 4 ml. of dioxan. The suspension is stirred, heated to 90° C., and then 0.11 ml. of 98% $H_2SO_4$ in 1 ml. of dioxan are added. A resinous precipitate is immediately formed. After cooling, the dioxan solution is decanted, the gummy residue is washed twice with 2 ml. of dioxan and treated with 4 ml. of isopropanol until conversion into the crystalline state is complete. The acid sulfate is separated from the mother liquor by filtration and washing with isopropanol. The crude acid sulfate is dissolved in the minimum of methanol (1 volume) and then 10 volumes of ethanol are added to the solution. The L-α-amino-ε-caprolactam acid sulfate separates in small hexagonal plates which melt at 170–172° C. and dissolve in water to give a solution which is acid to Congo red. The yield is 380 mg.

If L-α-amino-ε-caprolactam is treated with one half mol instead of 1 mol of sulfuric acid, the neutral sulfate is obtained in 85% yield. The neutral sulfate crystallizes from 95% ethanol as needles. M.P. 242–244° C. The solution of the neutral sulfate in water has a pH of about 5.

What is claimed is:

1. A process for the production of L-α-amino-ε-caprolactam from DL-α-amino-ε-caprolactam which consists essentially of reacting DL-α-amino-ε-caprolactam with substantially an equimolar amount of L-2-pyrrolidone-5-carboxylic acid in solution in an alkanol having at most two carbon atoms thereby producing and precipitating difficultly soluble L-α-amino-ε-caprolactam L-2-pyrrolidone-5-carboxylate while simultaneously producing D-α-amino-ε-caprolactam which remains in solution, separating the resultant difficultly soluble L-α-amino-ε-caprolactam L-2-pyrrolidone-5-carboxylate, converting said difficultly soluble L-α-amino-ε-caprolactam L-2-pyrrolidone-5-carboxylate into L-2-pyrrolidone-5-carboxylic acid and L-α-amino-ε-caprolactam hydrochloride by reacting a suspension of the L-α-amino-ε-caprolactam L-2-pyrrolidone-5-carboxylate with a solution of hydrogen chloride in dioxan, filtering off the L-α-amino-ε-caprolactam hydrochloride and then reacting the said hydrochloride in water solution with an equivalent of alkali metal hydroxide, evaporating the resultant solution and distilling free L-α-amino-ε-caprolactam from the so-obtained residue at reduced pressure and at a temperature of less than 120° C., and racemizing the aforesaid D-α-amino-ε-caprolactam by heating the same with an alkali metal alcoholate to a temperature of 150–165° C., and re-using the so-produced DL-α-amino-ε-caprolactam as starting material for the production of L-α-amino-ε-caprolactam by the herein-recited sequence of steps.

2. In a process for the production of L-α-amino-ε-caprolactam from DL-α-amino-ε-caprolactam, the step of reacting DL-α-amino-ε-caprolactam with substantially an equimolar amount of L-2-pyrrolidone-5-carboxylic acid in solution in an alkanol having at most two carbon atoms, and separating the resultant difficultly soluble L-α-amino-ε-caprolactam L-2-pyrrolidone-5-carboxylate from the solution.

3. In a process for the production of L-α-amino-ε-caprolactam from DL-α-amino-ε-caprolactam, the step of reacting DL-α-amino-ε-caprolactam with substantially an equimolar amount of L-2-pyrrolidone-5-carboxylic acid in solution in methanol, and separating the resultant difficultly soluble L-α-amino-ε-caprolactam L-2-pyrrolidone-5-carboxylate from the solution.

4. The pure, isomer free, L-α-amino-ε-caprolactam L-2-pyrrolidone-5-carboxylate, melting at about 198–201° C.

5. An independent entity consisting solely of crystalline L-α-amino-ε-caprolactam L-2-pyrrolidone-5-carboxylate.

References Cited by the Examiner
UNITED STATES PATENTS 2,528,267  10/1950  Dearborn et al. _____ 260—570.8
2,876,218  3/1959  Francis et al. _____ 260—239.3

OTHER REFERENCES

Adamson, J. Chem. Soc. (1943) p. 39.
Karrer, Org. Chemistry, pp. 92–93 (1938).
Karrer, "Organic Chemistry" (4th Ed.—English), pages 102–104 (1950).
Theilheimer, Synthetic Methods of Org. Chem., vol. 9, pp. 231–2 (1955).
Gilman, "Organic Chemistry," vol. I, chapter 3, part IV, pp. 176–200 (1938).

WALTER A. MODANCE, *Primary Examiner.*

IRVING MARCUS, *Examiner.*

J. E. PHILLIPS, R. T. BOND, *Assistant Examiners.*